US010750058B2

(12) United States Patent
Newman et al.

(10) Patent No.: US 10,750,058 B2
(45) Date of Patent: Aug. 18, 2020

(54) SYSTEMS AND METHODS FOR DETERMINING CAPTURE SETTINGS FOR VISUAL CONTENT CAPTURE

(71) Applicant: GoPro, Inc., San Mateo, CA (US)

(72) Inventors: David Newman, San Diego, CA (US); Jeffrey Youel, Rancho Santa Fe, CA (US); Joseph VanDalsem, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/232,541

(22) Filed: Dec. 26, 2018

(65) Prior Publication Data

US 2019/0132494 A1 May 2, 2019

Related U.S. Application Data

(63) Continuation of application No. 15/584,462, filed on May 2, 2017, now Pat. No. 10,200,575.

(51) Int. Cl.
*H04N 5/225* (2006.01)
*H04N 5/232* (2006.01)

(52) U.S. Cl.
CPC ........... *H04N 5/225* (2013.01); *H04N 5/2259* (2013.01); *H04N 5/23216* (2013.01);
(Continued)

(58) Field of Classification Search
CPC .... H04N 5/225; H04N 5/23296; H04N 5/235; H04N 5/2259; H04N 5/23245
See application file for complete search history.

(56) References Cited

U.S. PATENT DOCUMENTS 5,790,696 A 8/1998 Takahashi
6,757,446 B1 6/2004 Li
(Continued)

FOREIGN PATENT DOCUMENTS

EP 2334058 9/2016
WO 2010073192 7/2010

OTHER PUBLICATIONS

PCT International Search Report and Written Opinion for PCT/US14/51750, dated Sep. 9, 2014, 9 pages.
(Continued)

*Primary Examiner* — Tony Ko
(74) *Attorney, Agent, or Firm* — Esplin & Associates, PC

(57) ABSTRACT

A capture settings for one or more image capture devices may be determined. The capture setting may define one or more aspects of operation for the image capture device(s). The aspect(s) of operation for the image capture device(s) may include one or more aspects of operation for a processor of the image capture device(s), an image sensor of the image capture device(s), and/or an optical element of the image capture device(s). A machine-readable optical code may be generated based on the capture setting and/or other information. The machine-readable optical code may convey the capture setting for the image capture device(s) such that a first image capture device capturing a first image including the machine-readable optical code may: (1) identify the machine-readable optical code within the first image; (2) determine the capture setting conveyed by the machine-readable optical code; and (3) operate in accordance with the capture setting.

20 Claims, 8 Drawing Sheets

(52) U.S. Cl.
CPC ..... *H04N 5/23245* (2013.01); *H04N 5/23296* (2013.01); *H04N 5/232933* (2018.08)

(56) References Cited

U.S. PATENT DOCUMENTS

| | | | |
|---|---|---|---|
| 6,915,026 | B2 | 7/2005 | Sasai |
| 7,079,157 | B2 | 7/2006 | Deering |
| 8,045,788 | B2 | 10/2011 | Watkins |
| 8,145,013 | B1 | 3/2012 | Sahu |
| 8,218,895 | B1 | 7/2012 | Gleicher |
| 8,340,453 | B1 | 12/2012 | Chen |
| 8,493,459 | B2 | 7/2013 | Albu |
| 8,525,871 | B2 | 9/2013 | Agarwala |
| 8,723,959 | B2 | 5/2014 | Corcoran |
| 8,913,141 | B2 | 12/2014 | Campbell |
| 9,253,474 | B2 | 2/2016 | Rui |
| 2004/0017492 | A1 | 1/2004 | Stavely |
| 2009/0202177 | A1 | 8/2009 | Jeffrey |
| 2013/0141593 | A1 | 6/2013 | Bassi |
| 2014/0032406 | A1 | 1/2014 | Roach |
| 2016/0127654 | A1 | 5/2016 | Kraft |
| 2016/0173767 | A1 | 6/2016 | Woodman |
| 2018/0157885 | A1* | 6/2018 | Gurzumar .......... G06K 7/10801 |
| 2018/0198984 | A1 | 7/2018 | Palma |
| 2018/0249072 | A1 | 8/2018 | Li |
| 2018/0288311 | A1 | 10/2018 | Baghert |
| 2019/0373251 | A1* | 12/2019 | Schulz ................. G06K 7/1413 |
| 2020/0168253 | A1* | 5/2020 | Shah ..................... G11B 27/036 |

OTHER PUBLICATIONS

United States Office Action for U.S. Appl. No. 14/180,887, dated May 28, 2014, 10 pages.

Office Action for U.S. Appl. No. 14/536,315 dated Jun. 19, 2015, 5 pages.

Wang, Yu-Shuen, et al., "Optimized Scale-and-Stretch for Image Resizing", ACM Transactions on Graphics (TOG), ACM, vol. 27, No. 5, Article 118, Dec. 1, 2008, XP002609797, 8 pages.

Hwang, Daw-Sen, et al., "Content-Aware Image Resizing Using Perceptual Seam Carving with Human Attention Model", International Conference on Multimedia and Expo, 2008 IEEE, Piscataway, NJ, Jun. 23, 2008, XP032965469, pp. 1029-1032.

Avidan, S., et al., "Seam Carving for Content-Aware Image Resizing", ACM Transactions on Graphics (TOG), ACM, vol. 26, No. 3, Article 10, Jul. 1, 2007, XP007904203, 10 pages.

* cited by examiner

SYSTEMS AND METHODS FOR DETERMINING CAPTURE SETTINGS FOR VISUAL CONTENT CAPTURE

FIELD

This disclosure relates to determining capture settings of multiple image capture devices using a machine-readable optical code.

BACKGROUND

Manually setting capture settings of one or more image capture devices may be difficult and time consuming. Manually setting capture settings of one or more image capture devices may result in battery loss of the image capture device(s). As image capture devices become smaller, physically interacting with buttons or touchscreens of the image capture devices to configure the image capture devices may become more difficult. Facilitating a user to more easily set capture settings of image capture device(s) may encourage the use of the image capture device(s) by the user.

SUMMARY

This disclosure relates to determining captures settings for visual content capture. A capture settings for one or more image capture devices may be determined. The capture setting may define one or more aspects of operation for the image capture device(s). The aspect(s) of operation for the image capture device(s) may include one or more aspects of operation for a processor of the image capture device(s), an image sensor of the image capture device(s), and/or an optical element of the image capture device(s). A machine-readable optical code may be generated based on the capture setting and/or other information. The machine-readable optical code may convey the capture setting for the image capture device(s) such that a first image capture device capturing a first image including the machine-readable optical code may: (1) identify the machine-readable optical code within the first image; (2) determine the capture setting conveyed by the machine-readable optical code; and (3) operate in accordance with the capture setting.

A system that determines captures settings for visual content capture may include one or more processors, and/or other components. The processor(s) may be configured by machine-readable instructions. Executing the machine-readable instructions may cause the processor(s) to facilitate determining captures settings for visual content capture. The machine-readable instructions may include one or more computer program components. The computer program components may include one or more of a capture setting component, an optical code component, and/or other computer program components.

The capture setting component may be configured to determine one or more capture settings for one or more image capture devices. A capture setting may define one or more aspects of operation for the image capture device(s). One or more aspects of operation for the image capture device(s) may include one or more aspects of operation for a processor of the image capture device(s), an image sensor of the image capture device(s), an optical element of the image capture device(s), and/or other aspects of operation for the image capture device(s). In some implementations, one or more aspects of operation for the image capture device(s) may include one or more of a capture mode, a capture resolution, a capture framerate, a capture field of view, a capture visual processing, a capture shutter speed, and/or other aspects of operation for the image capture device(s). In some implementations, a capture setting may define one or more advanced aspects of operation for the image capture device(s). The advanced aspect(s) may not be configurable from a standard configuration user interface of the image capture device(s).

In some implementations, the capture setting component determining the capture setting(s) for the image capture device(s) may include accessing visual information defining visual content and/or other information. The visual content may have been captured using the capture setting(s), and the capture setting(s) may be stored in capture information for the visual content. The capture setting component may determine the capture setting(s) based on the capture information for the visual content and/or other information. In some implementations, the capture setting component may determine one or more changes in the capture setting(s) based on user input and/or other information. In some implementations, the visual information defining the visual content may be accessed based on the visual content including one or more highlight moments and/or other identification of the visual content.

In some implementations, the capture setting component determining the capture setting(s) for the image capture device(s) may include effectuating presentation of one or more user interfaces on a display. A user interface may include one or more fields corresponding to one or more aspects of operation for the image capture device(s). The field(s) may present one or more options for selection by a user to set one or more corresponding aspects of operation for the image capture device(s). The capture setting component may determine the capture setting(s) based on one or more of the options selected by the user and/or other information.

The optical code component may be configured to generate one or more machine-readable optical codes based on the capture setting(s). A machine-readable optical code may conveying the capture setting(s) for the image capture device(s) such that a first image capture device capturing a first image including the machine-readable optical code may: (1) identify the machine-readable optical code within the first image; (2) determine the capture setting(s) conveyed by the machine-readable optical code; and (3) operate in accordance with the capture setting(s).

In some implementations, a machine-readable optical code may convey the capture setting(s) for the image capture device(s) such that a second image capture device capturing a second image including the machine-readable optical code may: (1) identify the machine-readable optical code within the second image; (2) determine the capture setting(s) conveyed by the machine-readable optical code; and (3) operate in accordance with the capture setting(s).

In some implementations, a machine-readable optical code may convey different capture settings for different image capture devices such that a first image capture device may operate in accordance with a first capture setting and a second image capture device may operate in accordance with a second capture setting. The first image capture device may operate in accordance with the first capture setting based on the first image capture device capturing a first image including the machine-readable optical code. The second image capture device may operate in accordance with the second capture setting based on the second image capture device capturing a second image including the machine-readable optical code.

In some implementations, the first image capture device may operate in accordance with the first capture setting further based on a first identification of the first image capture device operating at a first location. The second image capture device may operate in accordance with the second capture setting further based on a second identification of the second image capture device operating at a second location. The first location may be different from the second location.

Use of the machine-readable optical code to configure image capture devices (e.g., enabling camera configuration via the lens, the minimum input expected of any image capture system) may allow for a simple configurable camera system. This enables setting of image capture configurations without the use of other sensor types (e.g., no BLE, Wifi, buttons, touchscreen).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
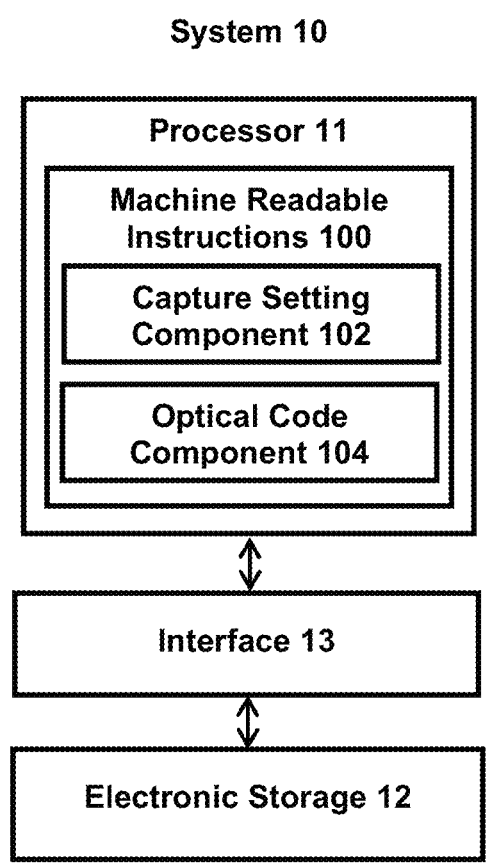
FIG. 1 illustrates a system that determines captures settings for visual content capture.

FIG. 1 illustrates a system 10 for determining capture settings for visual content capture. The system 10 may include one or more of a processor 11, an electronic storage 12, an interface 13 (e.g., bus, wireless interface), and/or other components. A capture settings for one or more image capture devices may be determined. The capture setting may define one or more aspects of operation for the image capture device(s). The aspect(s) of operation for the image capture device(s) may include one or more aspects of operation for a processor of the image capture device(s), an image sensor of the image capture device(s), an optical element of the image capture device(s), and/or other components of the image capture device(s). A machine-readable optical code may be generated based on the capture setting and/or other information. The machine-readable optical code may convey the capture setting for the image capture device(s) such that a first image capture device capturing a first image including the machine-readable optical code may: (1) identify the machine-readable optical code within the first image; (2) determine the capture setting conveyed by the machine-readable optical code; and (3) operate in accordance with the capture setting.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to capture setting, image capture devices, operation of image capture devices, components of image capture devices (e.g., processor, image sensor, optical element), machine-readable optical code, user interface, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate determining captures settings for visual content capture. The machine readable instructions 100 may include one or more computer program components. The machine readable instructions 100 may include one or more of a capture setting component 102, an optical code component 104, and/or other computer program components.

The capture setting component 102 may be configured to determine one or more capture settings for one or more image capture devices. A capture setting may define one or more aspects of operation for the image capture device(s). One or more aspects of operation for the image capture device(s) may include one or more aspects of operation for a processor of the image capture device(s), an image sensor of the image capture device(s), an optical element of the image capture device(s), and/or other aspects of operation for the image capture device(s). A capture setting may define one or more aspects of operation for the image capture device(s) for a time, over a period of time, at a location, or over a range of locations.

In some implementations, one or more aspects of operation for the image capture device(s) may include one or more of a capture mode, a capture resolution, a capture framerate, a capture field of view, a capture visual processing, a capture shutter speed, and/or other aspects of operation for the image capture device(s). A capture mode may refer to a pre-defined mode of operation for an image capture device. A capture mode may include manual modes and/or automatic modes. In some implementations, a capture mode may include an automatic capture mode. An image capture device operating in an automatic capture mode may capture visual content (e.g., images, videos) based on detection of particular visuals and/or audio. For example, an image capture device operating in an automatic capture mode may capture video content based on detection of a particular object, a particular action, a particular machine-readable optical code, a particular sound, and/or detection of other things/activity/events. A capture resolution may define the resolution at which visual content is captured. A capture frame rate may define the frame rate at which visual content is captured. A capture field of view may define the extent of an environment observable by an image capture device from a position/orientation. A capture visual processing may define visual manipulation performed by an image capture device during/after capture of visual content. A capture shutter speed may define the shutter speed at which visual content is captured. Other aspects of operation for the image capture device(s) are contemplated.

For example, one or more aspects of operation for the image capture device(s) may include single image capture, burst image capture, night lapse capture, image resolution, image framerate, camera field of view, zoon, image projection, image color balance, tonal curve, exposure compensation, color saturation, contrast, sharpening, softening, gamma, ISO limit, video stabilization, shutter speed, encoding parameters (e.g., codec type (H.264, HEVC), I-frame interval, macroblock size, deblocking filter, QP, capture timing (e.g., auto, interval, continuous, loop), and/or other aspects.

In some implementations, one or more aspects of operation for the image capture device(s) may include aspects of operation for one or more microphone/sound sensors of the image capture device(s). For example, one or more aspects of operation for the image capture device(s) may include number of channels, sample rate, compression format (e.g., AAC, MP3), averaging/filter window duration, and/or other aspects.

In some implementations, a capture setting may include a conditional aspects of operation for the image capture device(s). For example, a capture setting may define a particular operation to be performed by an image capture device based on occurrence of one or more events. A capture setting may include conditional statements (e.g., If This Then That) that provides for one or more particular operations based on certain conditions. For example, a capture setting may define different capture resolutions and/or frame rates for an image capture device based on the type of visuals the image capture device is configured to capture (e.g., action mode, still mode). Other conditional aspects of operation for the image capture device(s) are contemplated.

In some implementations, a capture setting may define one or more advanced aspects of operation for the image capture device(s). The advanced aspect(s) may not be configurable from a standard configuration user interface of the image capture device(s). For example, advanced aspect(s) may refer to hidden camera settings that may not be exposed via regular camera menus. A capture setting defining advanced aspect(s) of operation for the image capture device(s) may enable custom modes for advanced users, video production partners, technicians (e.g., manufacturing/ technical support personnel), and/or other users/organizations.

In some implementations, the capture setting component 102 determining the capture setting(s) for the image capture device(s) may include accessing visual information defining visual content and/or other information. The visual content may have been captured using the capture setting(s), and the capture setting(s) may be stored in capture information for the visual content. The capture information may be stored separately from the visual content and/or with the visual content. For example, the capture information may be stored in metadata of an image or a video. The metadata may be part of the file defining the image/video and/or part of another file. Storage of the capture setting(s) in capture information may enable a user to retrieve capture settings for a particular visual content (e.g., view capture setting(s) for the latest image/video taken). The capture setting component 102 may determine the capture setting(s) based on the capture information for the visual content and/or other information. For example, based on access of the visual information defining visual content, the capture setting component 102 may identify the capture information and retrieve the capture setting(s) used to captured the visual content.

In some implementations, the visual information defining the visual content may be accessed based on the visual content including one or more highlight moments and/or other identification of the visual content. For example, one or more images and/or videos (and/or particular frames of the videos) may be accessed based on the images/videos containing a highlight moment (manually or automatically detected), a particular scene/thing/event/activity, and/or other manual/automatic identification of the visual content. For example, a photo of the day may be posted on a social media portal. Based on the identification of the photo as "the photo of the day," the capture setting(s) used to capture the photo may be determined.

Figure 3:
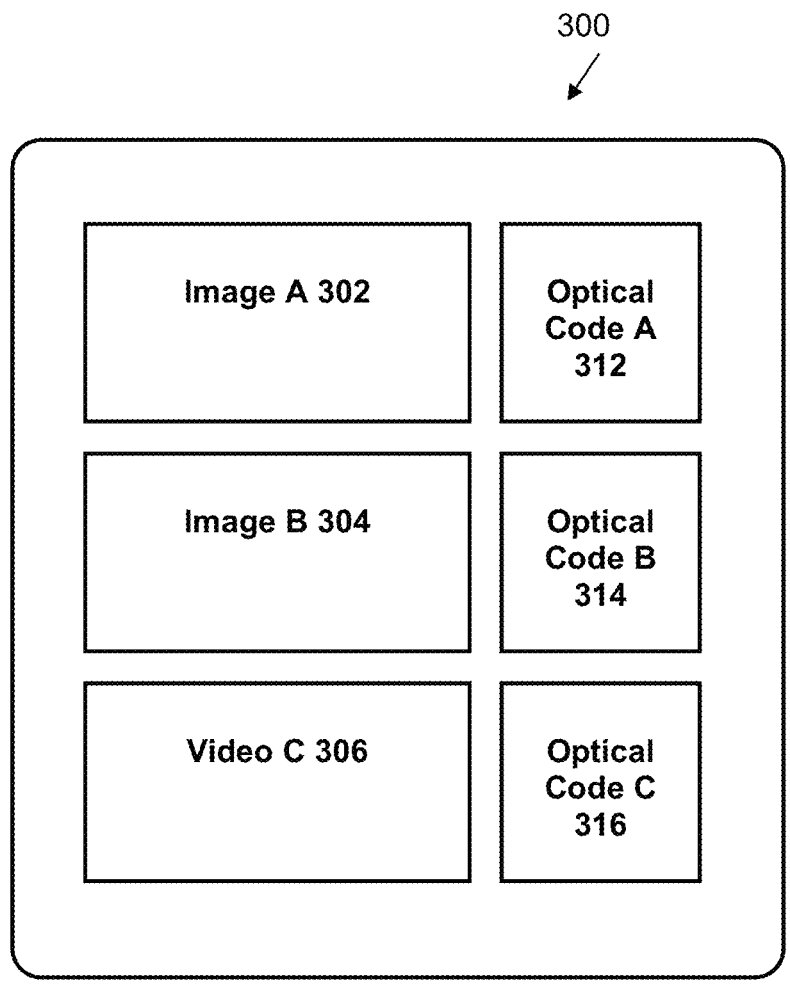
FIG. 3 illustrates an example display of visual content and corresponding machine-readable optical code.

One or more machine-readable optical codes may be generated based on the capture setting(s) for the accessed visual information. A machine-readable optical code may convey one or more capture settings. A machine-readable optical codes may be presented with the visual content to enable one or more users to configure their image capture devices using the capture settings for a particular visual content. For example, FIG. 3 illustrates an example display 300 of visual content and corresponding machine-readable optical code. The display 300 may include an image A 302 and a corresponding optical code A 312, an image B 304 and a corresponding optical code B 314, a video C 306 and a corresponding optical code C 316, and/or other visual content/machine-readable optical codes. The display 300 may correspond to a display of a device content (e.g., content captured by an image capture device, content stored in a computing device) or a display of a web content (e.g., content presented within a webpage). For example, the image A 302, the image B 304, and the video C 306 may include picture/video of the day, and one or more users may use the optical codes 312, 314, 316 to configure their image capture devices with the capture settings used to capture the image A 302, the image B 304, and/or the video C 306.

In some implementations, multiple machine-readable optical codes may be displayed per video content. For example, an image or a video may be generated using images or videos captured by multiple image capture devices (e.g., spherical image/video generated by stitching images/videos from multiple image capture devices). The different images/videos combined to generate the image/ video may have been captured using different capture settings. The different capture settings may be contained within a single machine-readable optical code or within multiple machine-readable codes.

In some implementations, the capture setting component 102 may determining one or more capture settings based on user input and/or other information. For example, the capture setting component 102 may determine a capture setting based on user input received via a button press, an interaction with a touchscreen interface, a wireless command received from another device, a voice command, a visual command, and/or other information. For example, an image capture device may operate in a machine-readable optical code generation mode based on user input and determine one or more capture settings used to capture visual content.

In some implementations, the capture setting component 102 may determine one or more changes in the capture setting(s) based on user input and/or other information. For example, the capture setting component 102 may determine a capture setting used to capture a particular image/video. The capture setting component 102 may present the capture setting to a user (e.g., via one or more user interfaces) and enable a user to change the determined capture setting. The capture setting component 102 may enable a user to change one or more aspects of operation of the image capture device defined by the determined capture setting, remove one or more aspects of operation of the image capture device defined by the determined capture setting, and/or add one or more aspects of operation of the image capture device to the aspects defined by the determined capture setting. Such changing of the capture setting(s) may enable a user to load a capture setting used to capture visual content and make modification to the loaded capture setting.

In some implementations, the capture setting component 102 determining the capture setting(s) for the image capture device(s) may include effectuating presentation of one or more user interfaces on a display. A user interface may include one or more fields corresponding to one or more aspects of operation for the image capture device(s). The field(s) may present one or more options for selection by a user to set one or more corresponding aspects of operation for the image capture device(s). The capture setting component 102 may determine the capture setting(s) based on one or more of the options selected by the user and/or other information.

The capture setting component 102 may present one or more user interfaces on a display of an image capture device and/or another computing device. For example, the capture setting component 102 may present one or more user interfaces on another computing device (e.g., smartphone, tablet, laptop, desktop) to enable off-line camera control of the image capture device. Using another computing device, rather than the image capture device, to determine the capture setting(s) for the image capture device(s) may enable a user to create and/or change capture settings without navigating through the menus provided on the image capture device(s) and without consuming battery of the image capture device(s).

Figure 4A:
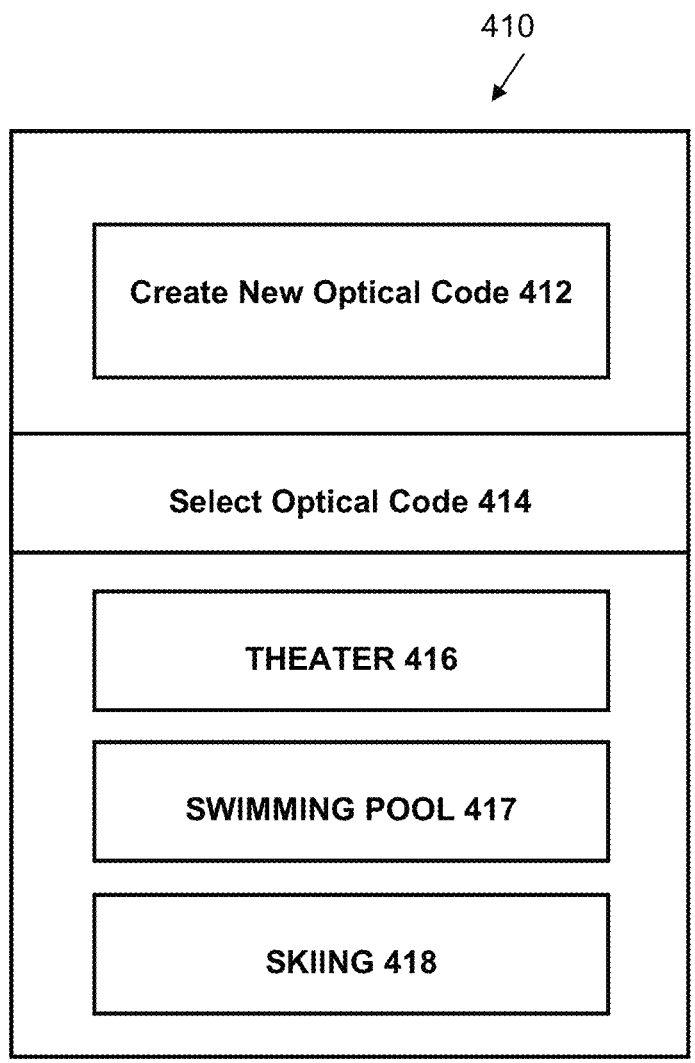
FIGS. 4A-4C illustrate example user interfaces for determining capture settings.
Figure 4B:
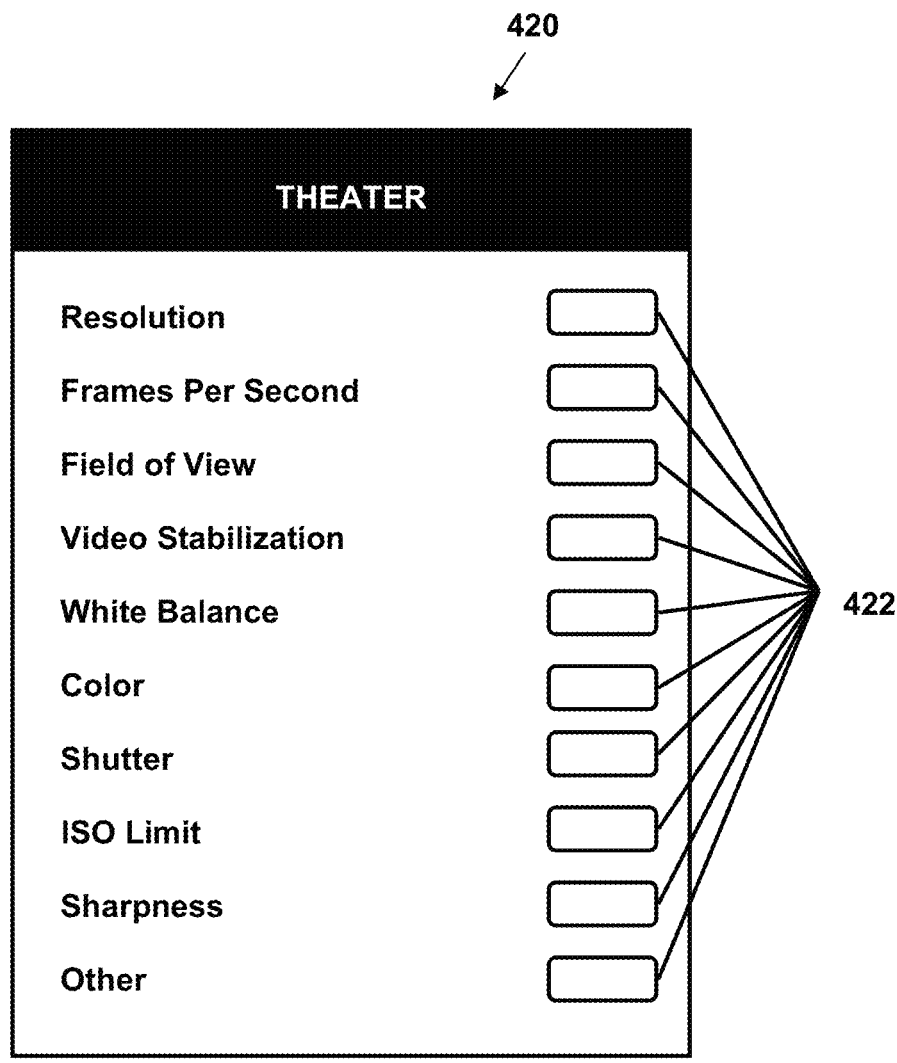
Figure 4C:
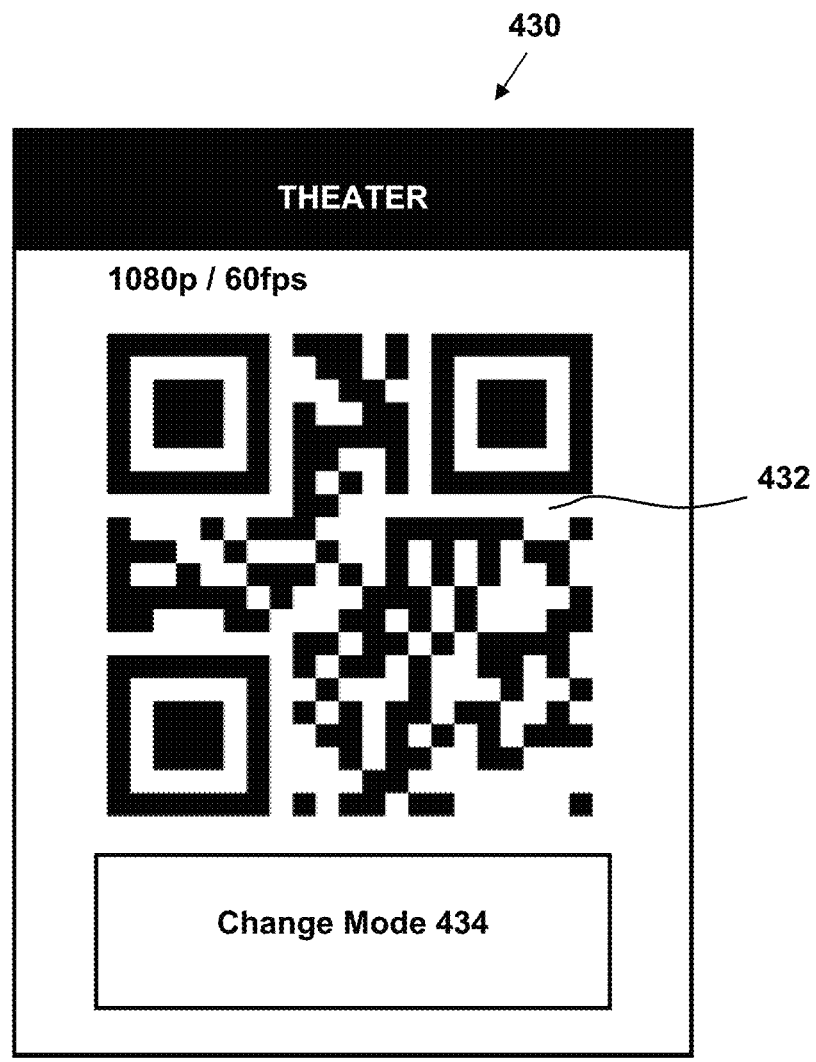

FIGS. 4A-4C illustrate example user interfaces 410, 420, 430 for determining capture settings. Uses of other user interfaces are contemplated. As shown in FIG. 4A, the user interface 410 may include a field 412 to create a new machine-readable optical code. Selecting the field 412 may enable a user to determine a new capture setting to be turned into a machine-readable optical code. The user interface 410 may include a field 414 to select a previously created/stored machine-readable optical codes. The user interface 410 may display names/identifiers of previously created/stored machine-readable optical codes, such as options 416, 417, 418, for fast access by a user. Selecting one of the options 416, 417, 418 may enable a user to use/view/change the capture setting(s) associated with the selected machine-readable optical code. In some implementations, the names/identifiers of previously created/stored machine-readable optical codes presented in the user interface 410 may include those machine-readable optical codes most used by a user, favorited by a user, most recently stored/acquired, and/or other machine-readable optical codes.

As shown in FIG. 4B, the user interface 420 may include fields 422 corresponding to one or more aspects of operation for the image capture device(s). The fields 422 may present one or more options for selection by a user to set one or more corresponding aspects of operation for the image capture device(s). The capture setting component 102 may determine the capture setting(s) based on one or more of the options selected by the user and/or other information. For example, the user interface 420 may present options for capture settings for the machine-readable optical code named "Theater." The options to set/change the capture settings for "Theater" may be displayed in response to the selection of the option 416 by a user in the user interface 410. A user may set and/or change one or more capture settings by interacting with the options 422. The options 422 may enable a user to select a preset value (e.g., a predefined resolution), enter a manual value, select to turn on or off a particular feature of the image capture device(s), and/or make other determinations as to one or more aspects of operation for the image capture device(s).

As shown in FIG. 4C, the user interface 430 may include an example machine readable-optical code 432. The machine-readable optical code 432 may be generated based on a user's selection of one or more options (e.g., the options 422) corresponding to one or more aspects of operation for the image capture device(s). The user interface 430 may include information relating to the machine-readable optical code 432, such as the name/identifier (e.g., Theater) associated with the machine-readable optical code 432, one or more aspects of the operation (e.g., 1080 p resolution, 60 fps capture rate) defined by the machine-readable optical code 432, and/or other information. The user interface 430 may include an option 434 to change the capture setting/machine-readable optical code 432 that is displayed. For example, a user selecting the option 434 may be able to choose other previously created/stored machine-readable optical codes (e.g., Swimming Pool, Skiing), choose to create a new machine-readable optical code, or change one or more aspects of operation for the image capture device(s) defined by the machine-readable optical code 432.

The optical code component 104 may be configured to generate one or more machine-readable optical codes based on the capture setting(s) and/or other information. A machine-readable optical code may include a visual representation of data. The visual representation of data may be readable by a computing device based on capture of an image/video including the machine-readable optical code. A machine-readable optical code may encode the data visually by varying the size and shape of patterns within the machine-readable optical code. The data may be encoded within a machine-readable optical code using one or more encoding modes.

In some implementations, a machine-readable optical code may include a one-dimensional machine-readable optical code (e.g., continuous or discrete barcodes), a two-dimensional machine-readable optical code (e.g., QR code), and/or a three-dimensional machine-readable optical code (e.g., holograms). In some implementations, a machine-readable optical code may include one or more varying components (e.g., a barcode/QR code/hologram that changes with time/location).

In some implementations, a three-dimensional machine-readable optical code may have dimensions of 480 pixels by 320 pixels. A machine-readable optical code may include corner elements (e.g., four or fewer corners for a QR code) that enable machine-readable optical code recognition while adjusting for scale, orientation, non-parallel reading plane, and data placed within the frame. Other dimensions and types of machine-readable optical codes are contemplated.

One or more machine-readable optical codes may be stored in one or more locations. For example, the machine-readable optical code(s) may be stored on a phone, a computer, a network site (e.g., cloud storage), and/or other locations. The machine-readable optical code(s) may be printed out in hard copy and/or presented on a display. In some implementations, different capture settings/capture modes may be encoded into different machine-readable optical codes, and a library of machine-readable optical codes may be used to quickly change capture settings/modes of one or more image capture devices. One or more machine-readable optical codes may be stored as presets for fast recall.

Use of a machine-readable optical code to configure image capture devices may enable quick switching between image capture modes/settings. For example, one or more image capture devices may be quickly configured for capturing different activities (e.g., snorkeling, surfing, skiing, touring, biking) via capturing images including different machine-readable optical codes. Machine-readable optical codes may be provided in a compilation (e.g., setup sheet) to facilitate the use of machine-readable optical codes. Machine-readable optical codes may be attached/embedded on an object for different activities (e.g., mount for surfing, handle for snorkeling, bike mount for biking) such that the desired capture settings are accessible to a user. Other uses of machine-readable optical codes are contemplated.

As image capture devices become smaller, physically interacting with buttons or touchscreens of the image capture devices to configure the image capture devices may become more difficult. Use of the machine-readable optical code to configure image capture devices (e.g., enabling camera configuration via the lens, the minimum input expected of any image capture system) allows for a simple configurable camera system. This enables setting of image capture configurations without the use of other sensor types (e.g., no BLE, Wifi, buttons, touchscreen).

In some implementations, the optical code component 104 may generate one or machine-readable optical codes based on user input and/or other information. For example, the optical code component 104 may generate a machine-readable optical code based on user input received via a button press, an interaction with a touchscreen interface, a wireless command received from another device, a voice command, a visual command, and/or other information.

A machine-readable optical code may conveying the capture setting(s) for the image capture device(s) such that a first image capture device capturing a first image including the machine-readable optical code may: (1) identify the machine-readable optical code within the first image; (2) determine the capture setting(s) conveyed by the machine-readable optical code; and (3) operate in accordance with the capture setting(s).

For example, a machine-readable optical code may be printed on a t-shirt of a skateboarder. When the skateboarder skates by an image capture device, the image capture device may capture an image including the machine-readable optical code. The image capture device may identify the machine-readable optical code within the image, determine the capture setting(s) conveyed by the machine-readable optical code, and operate in accordance with the capture setting(s). For example, the capture setting(s) may include a burst mode capture such that every time the image capture device captures the machine-readable code (e.g., every time the skateboarder skates by the image capture device) the image capture device executes burst image capture. Other operations of the image capture device in accordance with the capture setting(s) are contemplated.

In some implementations, a machine-readable optical code may convey the capture setting(s) for the image capture device(s) such that a second image capture device capturing a second image including the machine-readable optical code may: (1) identify the machine-readable optical code within the second image; (2) determine the capture setting(s) conveyed by the machine-readable optical code; and (3) operate in accordance with the capture setting(s). Thus, a single machine-readable optical code may convey the same capture setting(s) to be used by multiple image capture devices.

In some implementations, a machine-readable optical code may convey the capture setting(s) for particular image capture device(s) such that only particular image capture device(s) are configured based on the capture setting(s) conveyed by the machine-readable optical code. For example, a machine readable optical code may convey the capture setting(s) for image capture device(s) with a particular identification (e.g., serial number, version number), or may convey the capture setting(s) based on authentication (e.g., user input to provide password to access the conveyed setting(s)).

In some implementations, one or more image capture devices may be configured to store visual content at a first resolution (e.g., full resolution 4K) and display the stored visual content at a second resolution (e.g., lower resolution configured as a portion of the full resolution, e.g., 480×320 pixels). Decoding machine-readable optical codes using the full resolution may require expenditure of more resources (e.g., computing power/time, memory storage) than necessary. The image capture device(s) may be configured to utilize lower resolution version of the visual content for decoding the machine-readable optical codes. In some implementations, an image (e.g., a lower resolution image) for decoding the machine-readable optical codes may be transformed into a two-tone representation (e.g., black and white). The two-tone image may be analyzed in order to determine a spatial pattern of the machine-readable optical code and determine the capture setting(s) conveyed by the machine-readable optical code.

Use of machine-readable optical codes to configure image capture device operations may allow a user to set up one or more image capture devices without using an interface of the image capture device(s) (e.g., button presses, screen swipes) or a connection to another device (e.g., Bluetooth or WiFi pairing). A user may present a machine-readable optical code via a computing device or a hard copy, and point the image capture device at the machine-readable optical code to change one or more capture settings of the image capture device. A user may copy capture settings from one image capture device to another by presenting a machine-readable optical code on a display of one image capture device and capturing the machine-readable optical code with another image capture device. In some implementations, an image capture device may operate in a machine-readable optical code reading mode and determining one or more capture settings conveyed by a machine-readable optical mode based on user input (e.g., via a button press, an interaction with a touchscreen interface, a wireless command received from another device, a voice command, a visual command).

Figure 5:
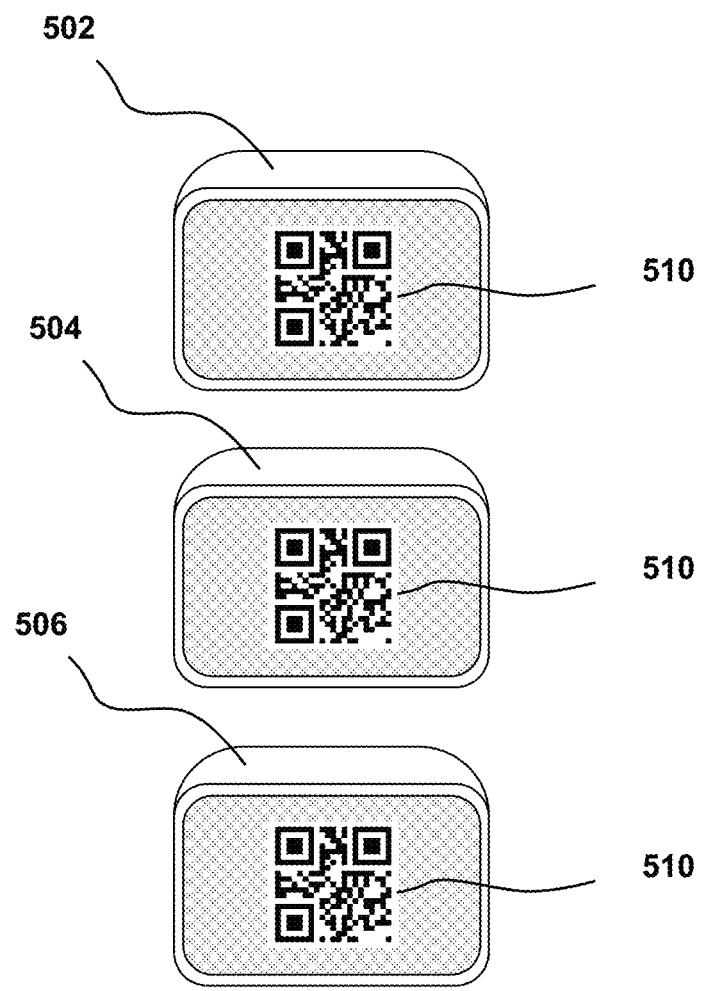
FIGS. 5-6 illustrate example uses of machine-readable optical code to configure multiple image capture devices.

FIG. 5 illustrates an example use of machine-readable optical code to configure multiple image capture devices. In FIG. 5, an image capture device 502 may display a machine-readable optical code 510 on its display. An image capture device 504 may capture an image including the machine-readable optical code 510 (presented on the display of the image capture device 502) and display the machine-readable optical code 510 on its display (e.g., along with other visuals captured by the image capture device 504). An image capture device 506 may capture an image including the machine-readable optical code 510 (presented on the display of the image capture device 504) and display the machine-readable optical code 510 on its display (e.g., along with other visuals captured by the image capture device 506). The image capture devices 504, 506 may determine the capture setting(s) conveyed by the machine-readable optical code 510; and operate in accordance with the capture setting(s). Such a chain approach may enable multiple image capture devices to be configured by a single machine-readable optical code. As another example, multiple image capture devices may be configured by the same machine-readable optical code based on the image capture devices capturing (e.g., being pointed in the direction of) the same machine-readable optical code. Other approaches to configure multiple image capture devices via a single machine-readable optical code are contemplated.

In some implementations, a machine-readable optical code may convey different capture settings for different image capture devices such that a first image capture device may operate in accordance with a first capture setting and a second image capture device may operate in accordance with a second capture setting. The first image capture device may operate in accordance with the first capture setting based on the first image capture device capturing a first image including the machine-readable optical code. The second image capture device may operate in accordance with the second capture setting based on the second image capture device capturing a second image including the machine-readable optical code. For example, referring to FIG. 5, the image capture devices 502, 504, 506 may operate in accordance with different capture settings based on the image capture devices 502, 504, 506 capturing images including the machine-readable optical code 510.

In some implementations, the first image capture device may operate in accordance with the first capture setting further based on a first identification of the first image capture device. The second image capture device may operate in accordance with the second capture setting further based on a second identification of the second image capture device. The identification of the image capture devices may relate to their location of operation, their operation purpose, and/or other criteria. For example, a single machine-readable optical code may include capture settings for image capture devices to be mounted on/used from different locations (e.g., different locations of car, bike, surfboard; different locations in a scene). Image capture devices in different locations may be configured with different capture settings. For example, an image capture device located closer to the ground may be configured for a wide angle field of view while an image capture device located higher up may be configured for a narrower field of view. The different image capture devices may be identified for different location/purpose and the capture settings may be determined based on the identification of the image capture devices.

Figure 6:
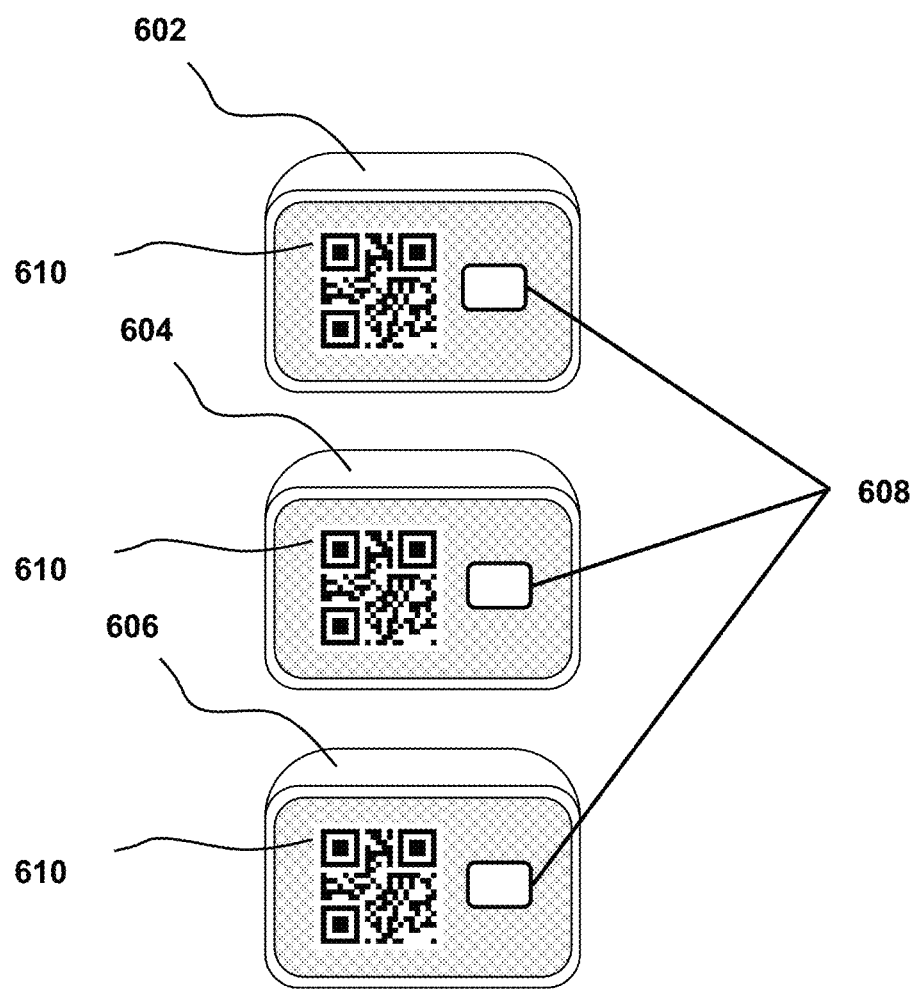

For example, referring to FIG. 6, image capture devices 602, 604, 606 may be configured/operate in accordance with multiple capture settings conveyed by a machine-readable optical code 610. The image capture devices 602, 604, 606 may present options 608 for a user to identify the image capture devices 602, 604, 606 (e.g., location of operation, purpose). Based on the identification of the image capture devices 602, 604, 606, the image capture devices 602, 604, 606 may be configured/operate in accordance with different capture settings conveyed by the machine-readable optical code 610. Other identification of the image capture devices/selection of capture settings are contemplated.

In some implementations, a machine-readable optical code may communicate other information to one or more image capture devices. Information communicated by a machine-readable optical code may be relevant to image capture device operations. For example, a machine-readable optical code may communicate time information that allows multiple image capture devices to synchronize capture of visual content (e.g., within 1 millisecond). A machine-readable optical code may communicate position information (e.g., destination, way-point), environment information, information regarding recommended image capture accessories, and/or other information.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components 102 and/or 104 may be eliminated, and some or all of its functionality may be provided by other computer program components. As another example, the processor 11 may be configured to execute one or more additional computer program components that may perform some or all of the functionality attributed to one or more of computer program components 102 and/or 104 described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
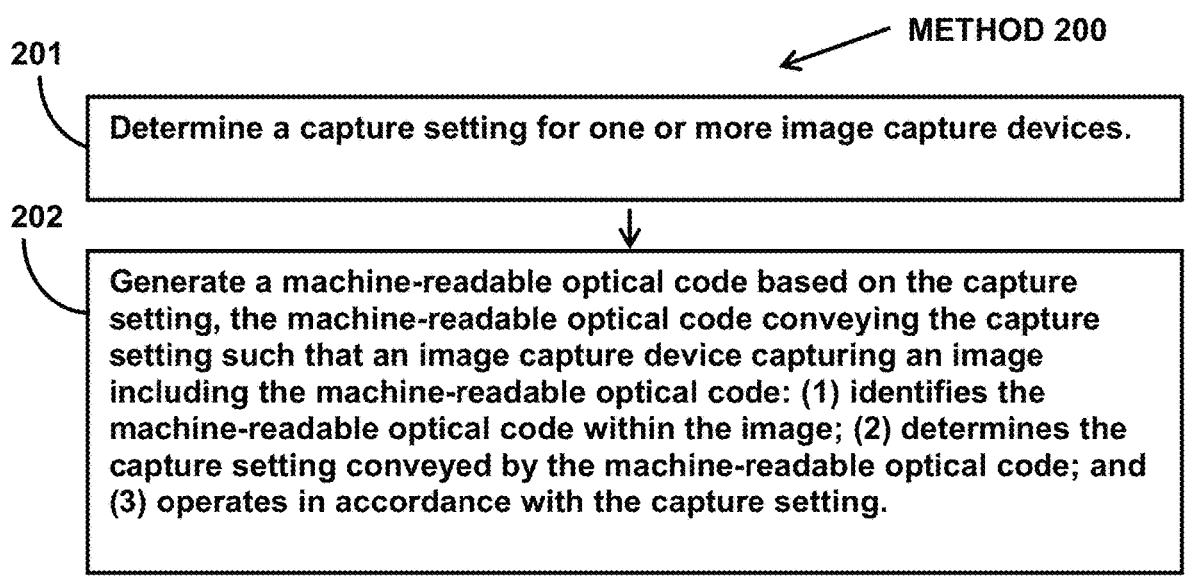
FIG. 2 illustrates a method for determining captures settings for visual content capture.

FIG. 2 illustrates method 200 for determining captures settings for visual content capture. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, a capture setting for one or more image capture devices may be determined. The capture setting may define one or more aspects of operation for the one or more image capture devices. The one or more aspects of operation for the one or more image capture devices may include one or more aspects of operation for a processor of the one or more image capture devices, an image sensor of the one or more image capture devices, and/or an optical element of the one or more image capture devices. In some implementation, operation 201 may be performed by a processor component the same as or similar to the capture setting component 102 (Shown in FIG. 1 and described herein).

At operation 202, a machine-readable optical code may be generated based on the capture setting. The machine-readable optical code may convey the capture setting for the one or more image capture devices such that an image capture device capturing an image including the machine-readable optical code: (1) identifies the machine-readable optical code within the image; (2) determines the capture setting conveyed by the machine-readable optical code; and (3) operates in accordance with the capture setting. In some implementations, operation 202 may be performed by a processor component the same as or similar to the optical code component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for determining capture settings for visual content capture, the system comprising:
one or more physical processors configured by machine-readable instructions to:
generate a machine-readable optical code based on a capture setting for one or more image capture devices, the capture setting defining one or more aspects of operation for the one or more image capture devices, the one or more aspects of operation for the one or more image capture devices including one or more aspects of operation for a processor of the one or more image capture devices, an image sensor of the one or more image capture devices, and/or an optical element of the one or more image capture devices; and
present the machine-readable optical code on a display, the machine-readable optical code conveying the capture setting for the one or more image capture devices such that a first image capture device capturing a first image including the machine-readable optical code:
identifies the machine-readable optical code within the first image;
determines the capture setting conveyed by the machine-readable optical code; and
operates in accordance with the capture setting.

2. The system of claim 1, wherein the machine-readable optical code conveys the capture setting for the one or more image capture devices such that a second image capture device capturing a second image including the machine-readable optical code:
identifies the machine-readable optical code within the second image;

determines the capture setting conveyed by the machine-readable optical code; and
operates in accordance with the capture setting.

3. The system of claim 1, wherein the machine-readable optical code conveys different capture settings for different image capture devices such that the first image capture device operates in accordance with a first capture setting based on the first image capture device capturing the first image including the machine-readable optical code and a second image capture device operates in accordance with a second capture setting based on the second image capture device capturing a second image including the machine-readable optical code.

4. The system of claim 3, wherein the first image capture device operates in accordance with the first capture setting further based on a first identification of the first image capture device operating at a first location and the second image capture device operates in accordance with the second capture setting further based on a second identification of the second image capture device operating at a second location, the first location being different from the second location.

5. The system of claim 1, wherein the capture setting for the one or more image capture devices is determined based on capture information for visual content, the visual content captured using the capture setting, the capture setting stored in the capture information for the visual content.

6. The system of claim 5, wherein the one or more physical processors are further configured by machine-readable instruction to change the capture setting based on user input.

7. The system of claim 5, wherein the capture setting is determined based on the capture information for the visual content based on the visual content including a highlight moment.

8. The system of claim 1, wherein the capture setting for the one or more image capture devices is determined based on one or more options selected by a user through a user interface, the user interface including one or more fields corresponding to the one or more aspects of operation for the one or more image capture devices, the one or more fields presenting one or more options for selection by the user to set one or more corresponding aspects of operation for the one or more image capture devices.

9. The system of claim 1, wherein the capture setting defines one or more advanced aspects of operation for the one or more image capture devices, the one or more advanced aspects not configurable from a standard configuration user interface of the one or more image capture devices.

10. The system of claim 1, wherein the one or more aspects of operation for the one or more image capture devices include one or more of a capture mode, a capture resolution, a capture framerate, a capture field of view, a capture visual processing, and/or a capture shutter speed.

11. A method for determining capture settings for visual content capture, the method comprising:
generating a machine-readable optical code based on a capture setting for one or more image capture devices, the capture setting defining one or more aspects of operation for the one or more image capture devices, the one or more aspects of operation for the one or more image capture devices including one or more aspects of operation for a processor of the one or more image capture devices, an image sensor of the one or more image capture devices, and/or an optical element of the one or more image capture devices; and
presenting the machine-readable optical code on a display, the machine-readable optical code conveying the capture setting for the one or more image capture devices such that a first image capture device capturing a first image including the machine-readable optical code:
identifies the machine-readable optical code within the first image;
determines the capture setting conveyed by the machine-readable optical code; and
operates in accordance with the capture setting.

12. The method of claim 11, wherein the machine-readable optical code conveys the capture setting for the one or more image capture devices such that a second image capture device capturing a second image including the machine-readable optical code:
identifies the machine-readable optical code within the second image;
determines the capture setting conveyed by the machine-readable optical code; and
operates in accordance with the capture setting.

13. The method of claim 11, wherein the machine-readable optical code conveys different capture settings for different image capture devices such that the first image capture device operates in accordance with a first capture setting based on the first image capture device capturing the first image including the machine-readable optical code and a second image capture device operates in accordance with a second capture setting based on the second image capture device capturing a second image including the machine-readable optical code.

14. The method of claim 13, wherein the first image capture device operates in accordance with the first capture setting further based on a first identification of the first image capture device operating at a first location and the second image capture device operates in accordance with the second capture setting further based on a second identification of the second image capture device operating at a second location, the first location being different from the second location.

15. The method of claim 11, wherein the capture setting for the one or more image capture devices is determined based on capture information for visual content, the visual content captured using the capture setting, the capture setting stored in the capture information for the visual content.

16. The method of claim 15, further comprising changing the capture setting based on user input.

17. The method of claim 15, wherein the capture setting is determined based on the capture information for the visual content based on the visual content including a highlight moment.

18. The method of claim 11, wherein the capture setting for the one or more image capture devices is determined based on one or more options selected by a user through a user interface, the user interface including one or more fields corresponding to the one or more aspects of operation for the one or more image capture devices, the one or more fields presenting one or more options for selection by the user to set one or more corresponding aspects of operation for the one or more image capture devices.

19. The method of claim 11, wherein the capture setting defines one or more advanced aspects of operation for the one or more image capture devices, the one or more advanced aspects not configurable from a standard configuration user interface of the one or more image capture devices.

20. The method of claim 11, wherein the one or more aspects of operation for the one or more image capture devices include one or more of a capture mode, a capture resolution, a capture framerate, a capture field of view, a capture visual processing, and/or a capture shutter speed.

* * * * *